US009231841B2

(12) United States Patent
Ibanez et al.

(10) Patent No.: US 9,231,841 B2
(45) Date of Patent: Jan. 5, 2016

(54) BEARER CONTROL ON THE BASIS OF PROBING

(75) Inventors: Juan-Antonio Ibanez, Solna (SE); Per Willars, Vaxholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 98 days.

(21) Appl. No.: 14/127,869

(22) PCT Filed: Jul. 8, 2011

(86) PCT No.: PCT/EP2011/061685
§ 371 (c)(1),
(2), (4) Date: Dec. 19, 2013

(87) PCT Pub. No.: WO2013/007287
PCT Pub. Date: Jan. 17, 2013

(65) Prior Publication Data
US 2014/0126406 A1    May 8, 2014

(51) Int. Cl.
| | | |
|---|---|---|
| H04L 12/28 | (2006.01) | |
| H04L 12/26 | (2006.01) | |
| H04L 12/24 | (2006.01) | |
| H04L 12/841 | (2013.01) | |
| H04W 28/24 | (2009.01) | |
| H04L 12/801 | (2013.01) | |
| H04W 76/02 | (2009.01) | |
| H04W 76/06 | (2009.01) | |

(52) U.S. Cl.
CPC ........ *H04L 43/0864* (2013.01); *H04L 41/5025* (2013.01); *H04L 47/283* (2013.01); *H04W 28/24* (2013.01); *H04L 47/14* (2013.01); *H04W 76/025* (2013.01); *H04W 76/064* (2013.01)

(58) Field of Classification Search
USPC .......................................... 370/252, 329, 431
See application file for complete search history.

(56) References Cited

U.S. PATENT DOCUMENTS 6,681,099 B1 * 1/2004 Keranen et al. ............ 455/67.16
7,254,401 B2 * 8/2007 Keranen et al. ............ 455/456.1
7,894,364 B2 * 2/2011 Baron et al. ................... 370/252
(Continued)

FOREIGN PATENT DOCUMENTS

WO    WO 2010/112077 A1    10/2010
WO    WO 2011/000414 A1    1/2011

OTHER PUBLICATIONS

International Search Report, PCT/EP2011/061685, Aug. 10, 2011.
(Continued)

*Primary Examiner* — Phuc Tran
(74) *Attorney, Agent, or Firm* — Myers Bigel Sibley & Sajovec, P.A.

(57) ABSTRACT

For maintaining a certain quality of service for a certain type of data traffic, the data traffic may be directed to a corresponding bearer established with respect to a user equipment. By sending probe packets on the bearer and/or on a further bearer and receiving a response packets returned in response to the probe packets, a parameter corresponding to a time period between sending a probe packet and receiving the corresponding response packet can be measured. On the basis of the measured parameter, a bearer control procedure with respect to the user equipment is initiated. This bearer control procedure may for example include directing data packets of selected data traffic from one bearer to another bearer, modification of at least one quality of service parameter of a bearer, and/or establishing or releasing a bearer.

21 Claims, 6 Drawing Sheets

(56) References Cited

U.S. PATENT DOCUMENTS

| | | | |
|---|---|---|---|
| 8,078,208 B2* | 12/2011 | Wolman et al. | 455/515 |
| 8,626,151 B2* | 1/2014 | Beppler et al. | 455/425 |
| 8,768,289 B2* | 7/2014 | Siomina et al. | 455/404.1 |
| 8,797,997 B2* | 8/2014 | Jang et al. | 370/331 |
| 2004/0097191 A1* | 5/2004 | Meyer et al. | 455/11.1 |
| 2009/0215438 A1* | 8/2009 | Mittal et al. | 455/418 |
| 2010/0180172 A1* | 7/2010 | Weimann et al. | 714/750 |
| 2010/0226267 A1* | 9/2010 | Jang et al. | 370/252 |
| 2010/0325714 A1* | 12/2010 | Iyer et al. | 726/8 |
| 2011/0149726 A1 | 6/2011 | Rahman et al. | |
| 2014/0219093 A1* | 8/2014 | Damola et al. | 370/235 |

OTHER PUBLICATIONS

Written Opinion of the International Searching Authority, PCT/EP2011/061685, Aug. 10, 2011.

International Preliminary Report on Patentability, PCT/EP2011/061685, Jun. 21, 2013.

* cited by examiner

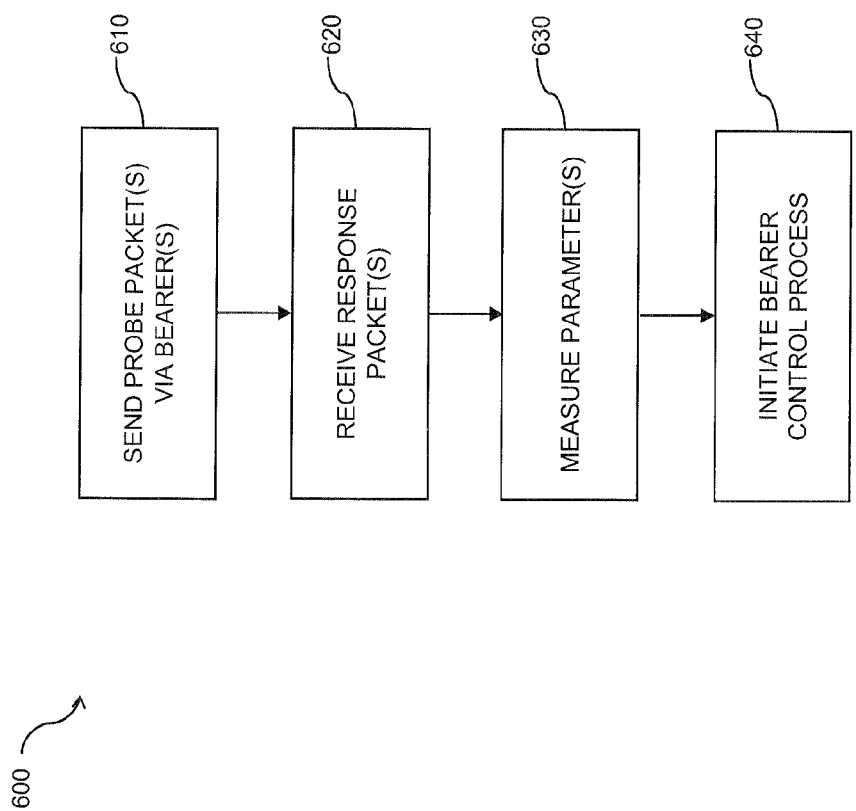

BEARER CONTROL ON THE BASIS OF PROBING

CROSS REFERENCE TO RELATED APPLICATION

This application is a 35 U.S.C. §371 national stage application of PCT International Application No. PCT/EP2011/061685, filed on 8 Jul. 2011, the disclosure and content of which is incorporated by reference herein in its entirety. The above-referenced PCT International Application was published in the English language as International Publication No. WO 2013/007287 A1 on 17 Jan. 2013.

TECHNICAL FIELD

The present invention relates to methods of controlling data traffic and to a corresponding device.

BACKGROUND

In communication networks, differentiated handling of network traffic may be used to meet requirements with respect to Quality of Service (QoS) depending on the type of network traffic. For this purpose, a forwarding treatment of data packets, i.e., the way of forwarding data packets by a node, may be adjusted so as to obtain a desired QoS level or prioritize certain types of traffic over others.

For example, in mobile communication networks network traffic related to a specific service may be directed to a bearer offering a certain QoS level. In this respect, a bearer is considered to be an information transmission context or path of defined characteristics, e.g. capacity, delay and/or bit error rate. It is possible to establish a number of bearers between a gateway of a mobile communication network and a user equipment (UE), e.g., a mobile phone or other type of mobile terminal. A bearer may carry downlink (DL) data traffic in a direction from the network to the user equipment, and may carry data traffic in an uplink (UL) direction from the user equipment to the network. In the gateway and in the UE the data traffic, which includes a plurality of IP data packets (IP: "Internet Protocol", which may be the IP Version 4, also referred to as IPv4, or the IP Version 6, also referred to as IPv6) can be filtered, e.g. using IP 5-tuple packet filters, thereby directing the IP data packets to a desired bearer.

However, when performing differentiated handling by directing certain types of data traffic to a corresponding bearer, situations may arise in which available resources are not used in the best way. For example, there may be a situation in which data traffic to be prioritized is assigned to a priority bearer, but using this priority bearer is actually not necessary to achieve a desired Quality of Experience (QoE) at the UE. This may for example be the case if there is a low load in the network.

Accordingly, there is a need for techniques which allow for an efficient usage of resources when performing differentiated handling of data traffic.

SUMMARY

According to an embodiment of the invention, a method of controlling data traffic is provided. According to the method, at least one probe packet is sent via a bearer established with respect to a user equipment. Then, at least one response packet returned in response to the probe packet is received and a parameter corresponding to a time period between the sending of the probe packet the receiving of the response packet is measured. On the basis of the measured parameter, a bearer control procedure with respect to the user equipment is initiated.

According to a further embodiment of the invention, a device is provided. The device is provided with a packet interface, a memory, and a processor. The packet interface is configured for sending at least one probe packet via a bearer established with respect to a user equipment and for receiving at least one response packet returned in response to the probe packet. The processor is configured to measure a parameter corresponding to a time period between the sending of the probe packet and the receiving of the response packet and, on the basis of the measured parameter, to initiate a bearer control procedure with respect to the user equipment.

According to further embodiments, other methods, devices, or computer program products for implementing the methods may be provided.

BRIEF DESCRIPTION OF THE DRAWINGS

FIG. 6 shows a flowchart for illustrating a method according to an embodiment of the invention.

DETAILED DESCRIPTION OF EMBODIMENTS

Figure 1:
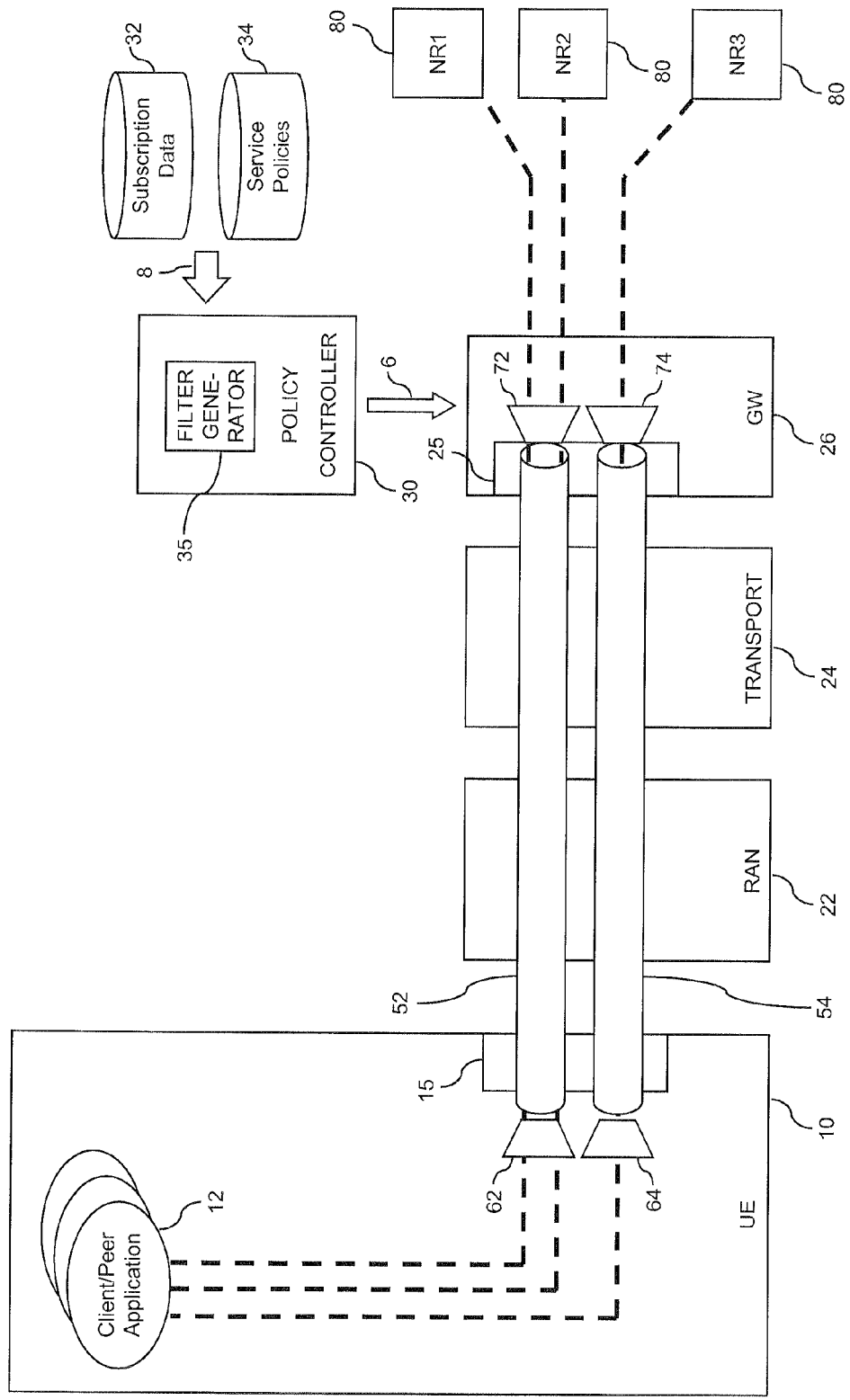
FIG. 1 schematically illustrates a communication system in which concepts according to embodiments of the invention may be implemented.

In the following, the invention will be explained in more detail by referring to exemplary embodiments and to the accompanying drawings. The illustrated embodiments relate to concepts of handling of network traffic. As illustrated in FIG. 1, the concepts are applied in a mobile communication network according to the 3GPP (Third Generation Partnership Project) Technical Specifications (TSs). However, it is to be understood that the illustrated concepts may be applied in other types of communication network as well, e.g. using fixed access technology such as DSL, fiber optical access, or coaxial cable access.

FIG. 1 schematically illustrates a communication network environment in which concepts according to embodiments of the invention can be applied.

The communication network environment includes a UE 10, which may also be referred to as a terminal, and a number of network components 22, 24, 26, 30. Among these network components there is a Radio Access Network (RAN) 22. The RAN is based on a certain type or certain types of radio access technology, e.g. GSM (Global System for Mobile Communications), EDGE (Enhanced Data Rate for GSM Evolution), UMTS (Universal Mobile Telecommunications System), HSPA (High Speed Packet Access), or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a System Architecture Evolution Gateway (SAE GW) according to the 3GPP TSs.

In addition, the mobile communication network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 6, which may be implemented using the Gx interface according to the 3GPP TSs. The policy controller 30 may be further coupled to a subscription database 32 and to a service policy database 34 via a signaling path 8, e.g., implemented using the Sp interface according to the 3GPP TSs. The policy controller 30 may thus receive policy data relating to a specific user and/or relating to a specific service available in the mobile communication network, e.g., mobile TV or delivery of content.

Among other functions, the policy controller 30 may comprise a filter generator 35. The filter generator 35 is adapted to specify packet filters to be used in the UE 10 and the gateway 26, which may be accomplished on the basis of subscription data from the subscription database 32, and service policies from the service policy database 34.

As further illustrated, data traffic between the network and the user equipment 10 can be carried by a number of bearers 52, 54. The data traffic typically pertains to one or more client/peer applications 12 running on the UE 10, e.g., may relate to certain services. As illustrated, the data traffic may be communicated between the UE 10 and various network resources 80, in the illustrated example a first network resource (NR1), a second network resource (NR2), and a third network resource (NR3). In the illustrated example, data traffic communicated between the UE 10 and the first network resource NR1 and data traffic communicated between the UE 10 and the second network resource NR2 is carried by the bearer 52. Data traffic communicated between the UE 10 and the third network resource NR3 is carried by the bearer 54. Accordingly, selected data traffic is directed to one of the bearers 52, 54.

The bearers 52, 54 are established between the user equipment 10 and the gateway 26. The bearers 52, 54 carry data traffic in both the DL and the UL direction, i.e., may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided with a corresponding interface 25 which allows for receiving incoming data packets from the bearers 52, 54 and sending outgoing data packets on the bearers 52, 54.

The bearers 52, 54 may include a default bearer 52 generally established for offering packet-based services to the user equipment 10 and, optionally, one or more dedicated bearer 54 which may have different QoS level, e.g., a higher or lower QoS level, than the default bearer. The default bearer 52 is typically established when the UE 10 attaches to the gateway 26. The dedicated bearer may be established on demand, e.g., when data packets of selected data traffic requiring a certain QoS level need to be transmitted.

Each bearer 52, 54 may be associated with a corresponding QoS profile. The QoS profile may be defined through QoS parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR). Accordingly, a certain QoS level may be provided for communicating data packets between the UE 10 and the gateway 26 by directing the data packets to a corresponding bearer. In addition, the QoS level provided for communicating the data packets may also be adapted by modifying an existing bearer, e.g., the default bearer 52. Typically, a dedicated bearer will differ from the default bearer 52 in at least one of the QoS parameters.

In the UE 10, the data packets are directed to a desired bearer 52, 54 using correspondingly configured UL packet filters 62, 64. In the gateway 26, the data packets are directed to the desired bearers 52, 54 using correspondingly configured DL packet filters 72, 74. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 using the signaling path 6. As regards the UL packet filters 62, 64 used in the UE 10, these may be signaled from the policy controller 30 via the gateway 26 to the UE 10.

In the following, concepts according to embodiments of the invention will be explained, which allow for an efficient use of resources while providing a desired level of QoS for a certain type of data packets, i.e., for selected data traffic. These concepts are based on probing one or more bearers established with respect to the UE 10. More specifically, the following explanations involve probing the default bearer 52 and the dedicated bearer 54. However, it is to be understood that also any other combination of bearers, e.g., two different dedicated bearers, or only a single bearer, e.g., only the default bearer or only a certain dedicated bearer, may be subjected to probing as explained in the following.

As explained above, the dedicated bearer 54 may be established for carrying selected data traffic to or from the UE 10. The selected data traffic may for example include prioritized content or premium content, for which a higher level of QoS is desired. In this way, a user of the UE 10 may be offered an improved QoE when using a service which is based on the selected data traffic, e.g., a content delivery from a content data network (CDN) to give an example of of the network resources 80 as illustrated in FIG. 1.

In some situations, e.g., if there is low load in the network, the improvements in QoE as compared to using the default bearer 52 for the selected data traffic may not be noticeable by the user. In such situations, establishing the dedicated bearer 54 may therefore result in an unnecessary usage of resources, e.g., radio bandwidth, signaling in the network, processing of signals and data, battery life of the UE 10, or other resources. For example, if a UE 10 is alone in its cell, i.e., the RAN 22 serves no other UEs but the UE 10, there may be no other data traffic to prioritize against. Such an unnecessary usage of resources is not desirable.

Accordingly, concepts as explained herein involve probing at least one of the bearers 52, 54. In this way, it may be determined whether the default bearer 52 may be used for carrying the selected data traffic, without while still providing a desired QoE. More specifically, the probing includes sending at least one probe packet via the bearer to be probed and receiving at least one response packet returned in response to the probe packet. The response packet may be received via the bearer to be probed as well. For example, the probe packet may be sent to the UE 10 via a DL part of the bearer to be probed, and the response packet may be received from the UE 10 via an UL part of the bearer to be probed. Then a parameter corresponding to a time period between sending of the probe packet and receiving the response packet is measured. This parameter may represents a delay the selected data traffic is experiencing when transmitted on the probed bearer. For example, this parameter may be measured as a round-trip-time (RTT).

On the basis of the measured parameter, a bearer control procedure is initiated, e.g., establishing the dedicated bearer 54, releasing the dedicated bearer 54, directing data packets to or from one of the bearers 52, 54, or modifying at least one QoS parameter of one or more of the bearers 52, 54, e.g., to downgrade the dedicated bearer 54 or to upgrade the default bearer 52. For example, if the default bearer 52 is probed and the parameter indicates that the delay experienced by the selected data traffic on the default bearer 52 is equivalent to the delay experienced in an uncongested network, then prioritization is not needed and the dedicated bearer 54 may be released. The dedicated bearer 54 could also be downgraded by modifying one or more QoS parameter, e.g., so as to correspond to a best-effort bearer. The selected traffic may then be delivered via the default bearer 54. If the dedicated bearer 54 is not established yet, it may also be decided to refrain from establishing the default bearer 54 and to rather use the default bearer 52 for carrying the selected data traffic. If the parameter indicates that the delay experienced by the selected data traffic on the default bearer 52 is almost equivalent to the delay experienced in an uncongested network, the default bearer 52 could also be upgraded.

The parameter may be repeatedly measured, e.g., as long as there is an ongoing communication of the selected data traffic on any one of the bearers 52, 54. If such a repeated measurement indicates an increased delay, e.g., due to increased load in the network, a previously released dedicated bearer 54 may be re-established or a previously downgraded dedicated bearer 54 may be upgraded.

The above-mentioned bearer control processes may involve redirecting the selected data from one bearer to another bearer, which may be accomplished by adapting one or more of the packet filters 62, 64, 72, 74. In particular, the selected data traffic may be redirected to a bearer having a lower QoS level if the probing indicates that this bearer is still suitable to obtain a desired QoE.

Figure 2:
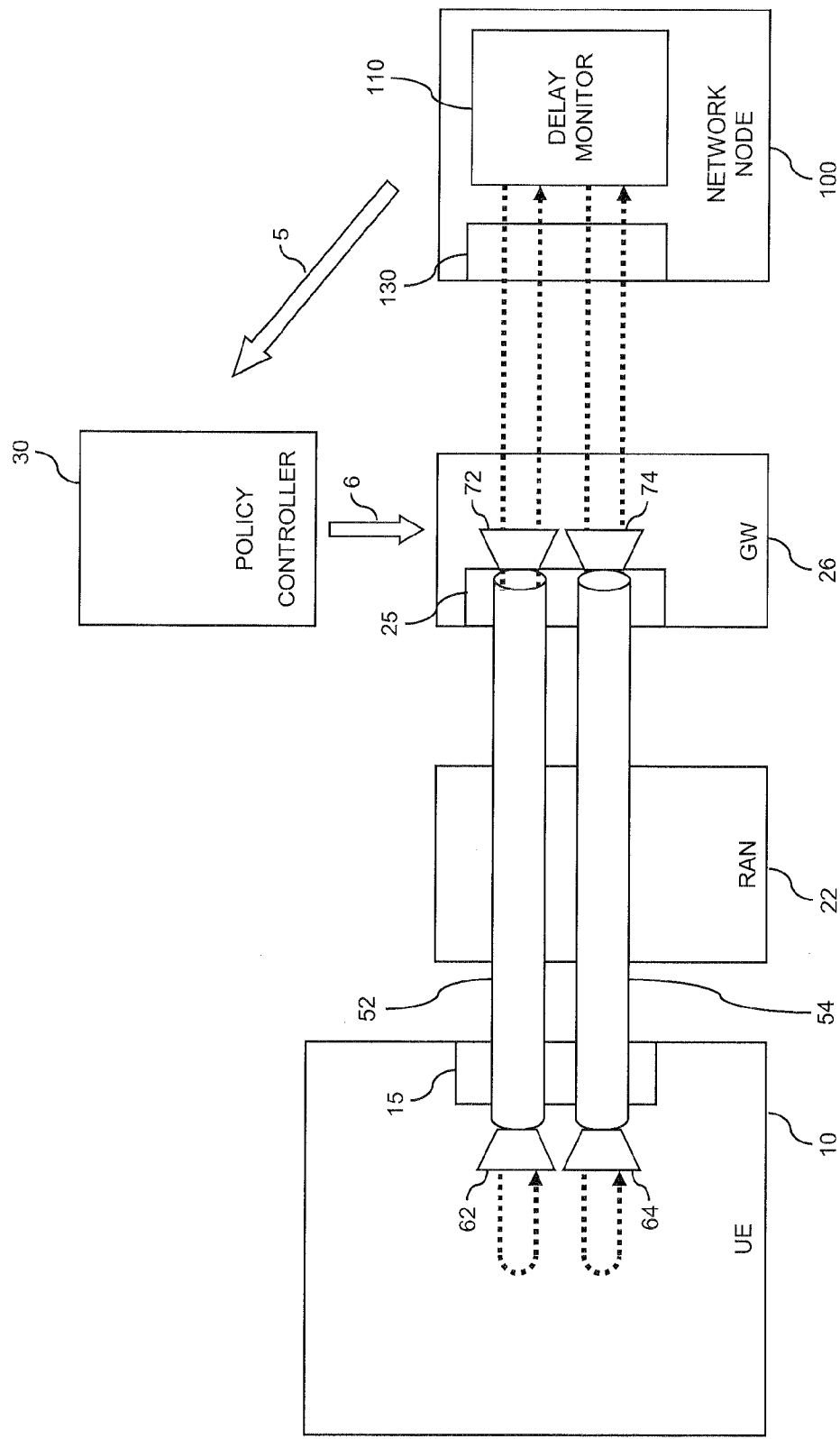
FIG. 2 schematically illustrates an implementation of concepts according to an embodiment of the invention in the communication system of FIG. 1.

An implementation of the above probing concepts according to an embodiment of the invention is further illustrated in FIG. 2. More specifically, FIG. 2 illustrates interactions between a network node 100, the UE 10, the RAN 22, the GW 26, and the policy controller 30. The transport node 24 is not illustrated, but may be present as well. In FIG. 2, the probing is performed by a network node 100, e.g., a network node for controlling delivery of content to users. As illustrated, the network node includes a delay monitor 110 and a packet interface 130. Further, the network node 100 also includes an interface with respect to a signaling path 5 to the policy controller 30. The signaling path 5 may be implemented using the Rx interface according to the 3GPP TSs.

In the scenario of FIG. 2, it is assumed that the transmission of selected data traffic requiring prioritized or otherwise differentiated handling has already triggered establishment of the dedicated bearer 54 with respect to the UE 10 or that the dedicated bearer 54 was already established for another reason, and that the selected data traffic would normally be carried by the dedicated bearer 54. Further, also the default bearer 52 is established with respect to the UE 10. In this situation, the delay monitor 110 of the network node 100 uses the packet interface 130 to periodically send probe packets on the default bearer 52 to the UE 10. In response to receiving the probe packets, the UE 10 sends response packets to the network node 100. That is to say, each probe packet triggers a corresponding response packet. For example, the probe packets can be an echo request packets of the Internet Control Message Protocol (ICMP), also referred to as Ping packets, which are sent by the network node 100 towards a network address, e.g., an IP address, of the UE 10 and cause the UE 10 to respond by sending ICMP echo reply packets back to the network node 100. However, also other types of probe packets could be used. For example, it would also be possible to use data packets of the selected data traffic or data packets of other data traffic, e.g., non-prioritized data traffic, as the probe packets, assuming that reception of these data packets triggers sending of a response packet, such as an acknowledgement packet of the Transmission Control Protocol (TCP). The latter possibility may for example be used if the selected data traffic is routed through the network node 100. The latter possibility may for example be used if the selected data traffic is routed through the network node 100.

The response packets are received via the packet interface 130 and detected by the delay monitor 110 which measures a parameter corresponding to the time period between sending a probe packet and receiving the corresponding response packet, e.g., a RTT. On the basis of the measured parameter, the network node 100 may initiate a bearer control procedure. For example, if the parameter measured on the default bearer 52 is below a threshold for a predefined number of consecutive measurements, the dedicated bearer 54 may be released and the selected data traffic may be directed to the default bearer 52. If the parameter is measured as a RTT, the threshold may correspond to a typical RTT in the unloaded network, optionally plus a certain margin, e.g., to take into account uncertainties in determining the typical RTT. Irrespective of initiating a bearer control procedure, the network node 100 may continue to probe the default bearer 52 as long as the selected data traffic is flowing, either on the default bearer 52 or on the dedicated bearer 54. In the illustrated scenario, the network node 100 uses the signaling path 5 for initiating the bearer control procedure by sending control signaling to the policy controller 30, e.g., a request to release the dedicated bearer 54. The policy controller 30 may in turn use the signaling path 6 to perform the bearer control procedure by sending control signaling to the gateway 26, e.g., a command to release the dedicated bearer 54.

As an alternative to releasing the dedicated bearer 54, the bearer control procedure may also involve keeping the dedicated bearer 54 active and modifying one or more of the packet filters 62, 64, 72, 74 so that the selected data traffic is directed to the default bearer 52. As an alternative to modifying one or more of the packet filters 62, 64, 72, 74, also a marking in the data packets, which is used by the packet filters to direct the data packets to the desired bearer, e.g., a Differentiated Services Code Point (DSCP) marking, could be modified.

The above bearer control procedure may thus lead to a situation in which the selected data traffic is being carried by the default bearer 52. In such a situation, continued measurement of the parameter may be used as a basis for initiating another bearer control procedure if the default bearer 52 degrades, e.g., due to increased load. For example, if the measured parameter on the default bearer 52 increases above a further threshold for a predefined number of consecutive measurements, indicating that load is increasing and queues are building up in the network, another bearer control procedure could be initiated by the network node 100 so as to restore the situation before the first bearer control procedure. This further threshold could be the same threshold as the one used for initiating the first bearer control procedure, but may also be set to be different so as to implement some hysteresis in the control process. Accordingly, if the parameter measured on the default bearer 52 indicates that the default bearer is no longer suitable for carrying the selected data traffic, the dedicated bearer 54 may be re-established and used again for carrying the selected data traffic or the selected data traffic may be redirected from the default bearer 52 back to the dedicated bearer by modifying one or more of the packet filters 62, 64, 72, 74 or a marking in the data packets.

In the case of keeping the dedicated bearer 54 active, also the dedicated bearer 54 may be subjected to probing as illustrated in FIG. 2. In this case, the delay monitor 110 may also use the packet interface 130 to periodically send further probe packets on the dedicated bearer 54 to the UE 10. In response to receiving the further probe packets, the UE 10 sends further response packets to the network node 100. That is to say, each further probe packet triggers a corresponding further response packet. The further response packets are received via the packet interface 130 and detected by the delay monitor 110 which measures a parameter corresponding to the time period between sending a further probe packet and receiving the corresponding response packet, e.g., a RTT. The default bearer 52 and the dedicated bearer 54 may thus be probed simultaneously. The parameter measured on the dedicated bearer 54 may be used as an additional or alternative basis for initiating the bearer control procedure. In particular, the parameter measured on the default bearer 52 may be compared to the parameter measured on the dedicated bearer 54. For example, if the difference of the parameter measured on the default bearer to the parameter measured on the dedicated bearer is below a threshold value, e.g., below some suitably selected positive margin, this may indicate that the default bearer 52 is suitable to carry the selected data traffic and may be used instead of the dedicated bearer 54 to carry the selected data traffic by initiating a corresponding bearer control procedure, e.g., involving modifying one or more packet filters, e.g., one or more of the packet filters 62, 64, 72, 74, or a marking in the data packets as explained above. If the difference between the parameter measured on the default bearer 52 and the parameter measured on the dedicated bearer 54 is higher than a predefined value this may indicate that the default bearer 52 is not suitable to carry the selected data, e.g., due to a congestion, and the dedicated bearer 54 may be used to carry the selected data traffic. When using such a comparison of parameters measured on different bearers, setting of absolute threshold values may be avoided.

Figure 3:
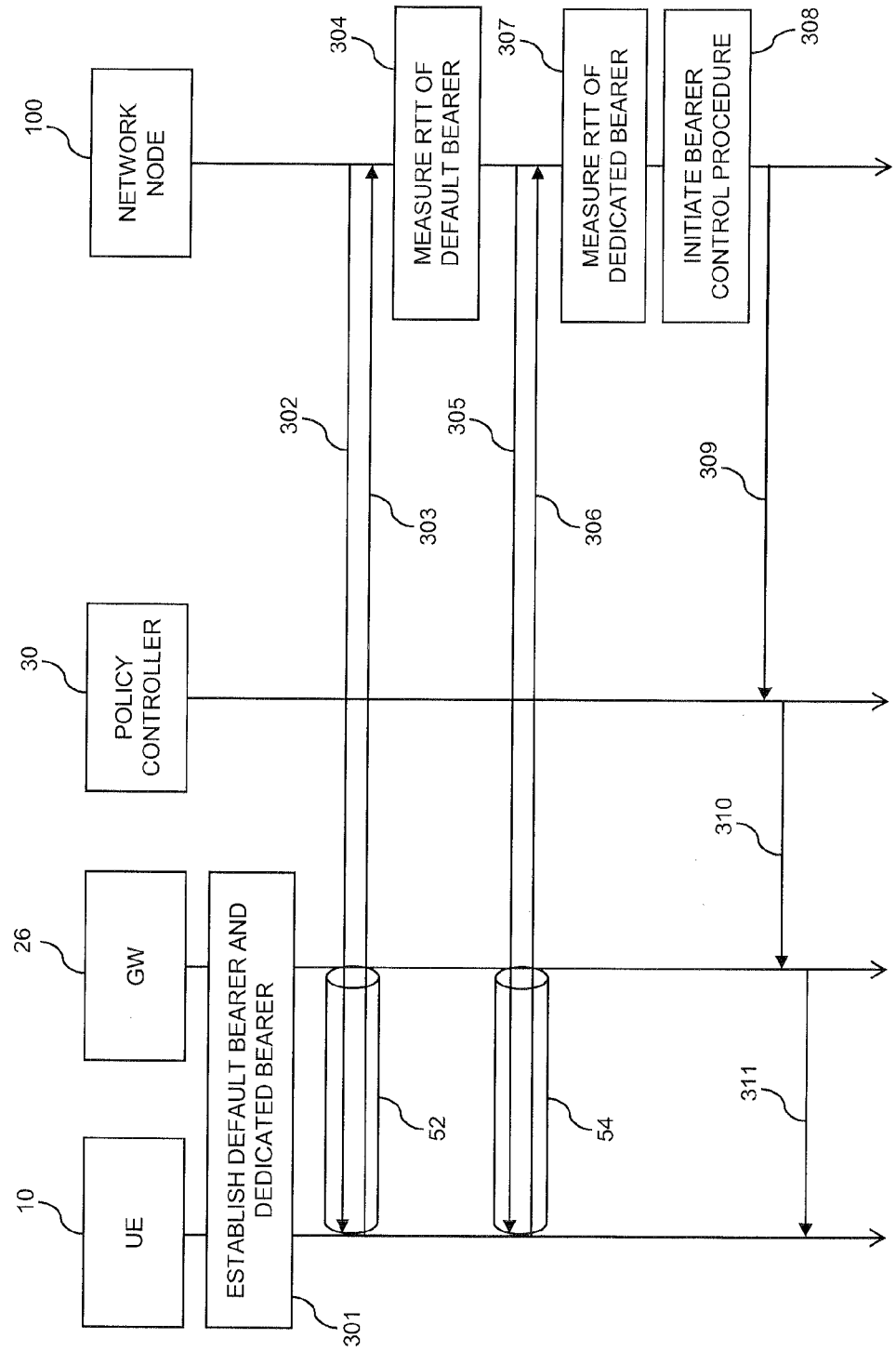
FIG. 3 shows a signaling diagram for illustrating bearer control on the basis of probing according to an embodiment of the invention.

FIG. 3 shows a signaling diagram for illustrating bearer control on the basis of probing according to an embodiment of the invention. In the signaling diagram, the UE 10, the GW 26, the policy controller 30, and the network node 100 are illustrated. Other nodes, such as the transport node 24 of FIG. 1 or the RAN of FIGS. 1 and 2 are not illustrated, but could be present as well.

As illustrated in FIG. 3, the default bearer 52 and a dedicated bearer 54 are initially established at step 301. Here it is to be understood that the default bearer and the dedicated bearer do not need to be established at the same time. For example, the default bearer could be established when the UE 10 attaches to the mobile network, whereas the dedicated bearer could be established when selected data traffic requiring a certain type of differentiated handling, e.g., prioritization, needs to be communicated with respect to the UE 10. However, in some scenarios both the default bearer 52 and the dedicated bearer 54 could be established when the UE 10 attaches to the mobile network.

The network node 100 then sends one or more probe packets 302 via the default bearer 52 to the UE 10. Upon receiving such a probe packet 302, the UE 10 returns a corresponding response packet 303 to the network node 100. As mentioned above, the probe packets 302 may for example be ICMP echo request packets or other types of packets causing the recipient of the packets to return corresponding response packets 303. For example, the probe packets 302 could also be data packets of the selected data traffic, which are transmitted according to the TCP or other transport protocol causing the recipient to return acknowledgement packets.

As illustrated by step 304, the network node 100 then measures a RTT of the default bearer 52. The RTT substantially corresponds to the time period between sending a probe packet 302 from the network node 100 and receiving the corresponding response packet 303 in the network node 100. In other implementations, other parameters representing a delay on the default bearer 52 could be measured.

In addition, the network node 100 also sends one or more further probe packets 305 via the dedicated bearer 54 to the UE 10. Upon receiving such a further probe packet 305, the UE 10 returns a corresponding further response packet 306 to the network node 100. The further probe packets 305 and further response packets 306 may be of the same type as the probe packets 302 and the response packets 303.

As illustrated by step 307, the network node 100 then measures a RTT of the dedicated bearer 54. The RTT substantially corresponds to the time period between sending a further probe packet 305 from the network node 100 and receiving the corresponding further response packet 306 in the network node 100. In other implementations, other parameters representing a delay on the dedicated bearer 54 could be measured.

It is to be understood that the above processes of probing the delay on the default bearer 52 and probing the delay on the dedicated bearer 54 do not need to occur in the illustrated order. Rather, there may be a continuous process of probing the default bearer 52 by repeatedly sending the probe packets 302, receiving the corresponding response packets 303, and measuring the RTT on the default bearer 52, and a continuous process of probing the dedicated bearer 54 by repeatedly sending the further probe packets 305, receiving the corresponding further response packets 306, and measuring the RTT on the dedicated bearer 54, and these continuous processes may execute in parallel.

As illustrated in step 308, the network node 100 may then initiate a bearer control procedure on the basis of the measured RTT of the default bearer 52 and the measured RTT on the dedicated bearer 54. In particular, the network node 100 may compare the measured RTT of the default bearer 52 to the measured RTT of the dedicated bearer 54, and decide on the basis of the comparison whether the default bearer is suitable to carry the selected data traffic which would normally be carried by the dedicated bearer 54. For example, if the difference of the RTT of the default bearer 52 to the RTT of the dedicated bearer 54 is below a certain value for a certain number of consecutive measurements, this may be interpreted by the network node 100 as an indication of the default bearer being suitable to carry the selected data traffic. If the default bearer 52 is found to be suitable to carry the selected data traffic, the network node initiates the bearer control procedure to cause the selected data traffic to be directed to the default bearer 52, e.g., by modifying one or more packet filters or a marking of the packets as explained above.

The network node 100 initiates the bearer control procedure by sending control signaling 309 to the policy controller 30. The policy controller 30 in turn executes the bearer control procedure by sending control signaling 310 to the GW 26. Further, the bearer control procedure may also involve control signaling 311 from the GW 26 to the UE 10. In other implementations, the bearer control procedure could be implemented in a different way, e.g., using direct control signaling from the network node 100 to the GW 26.

It is to be understood that the probing of the default bearer 52 and the dedicated bearer 54 may continue after the bearer control procedure, i.e., while the selected data traffic is carried by the default bearer 52. If the continued probing at some time indicates that the default bearer 52 is no longer suitable to carry the selected data traffic, a further bearer control procedure may be initiated by the network node 100 to direct the selected data traffic back to the dedicated bearer 54.

Figure 4:
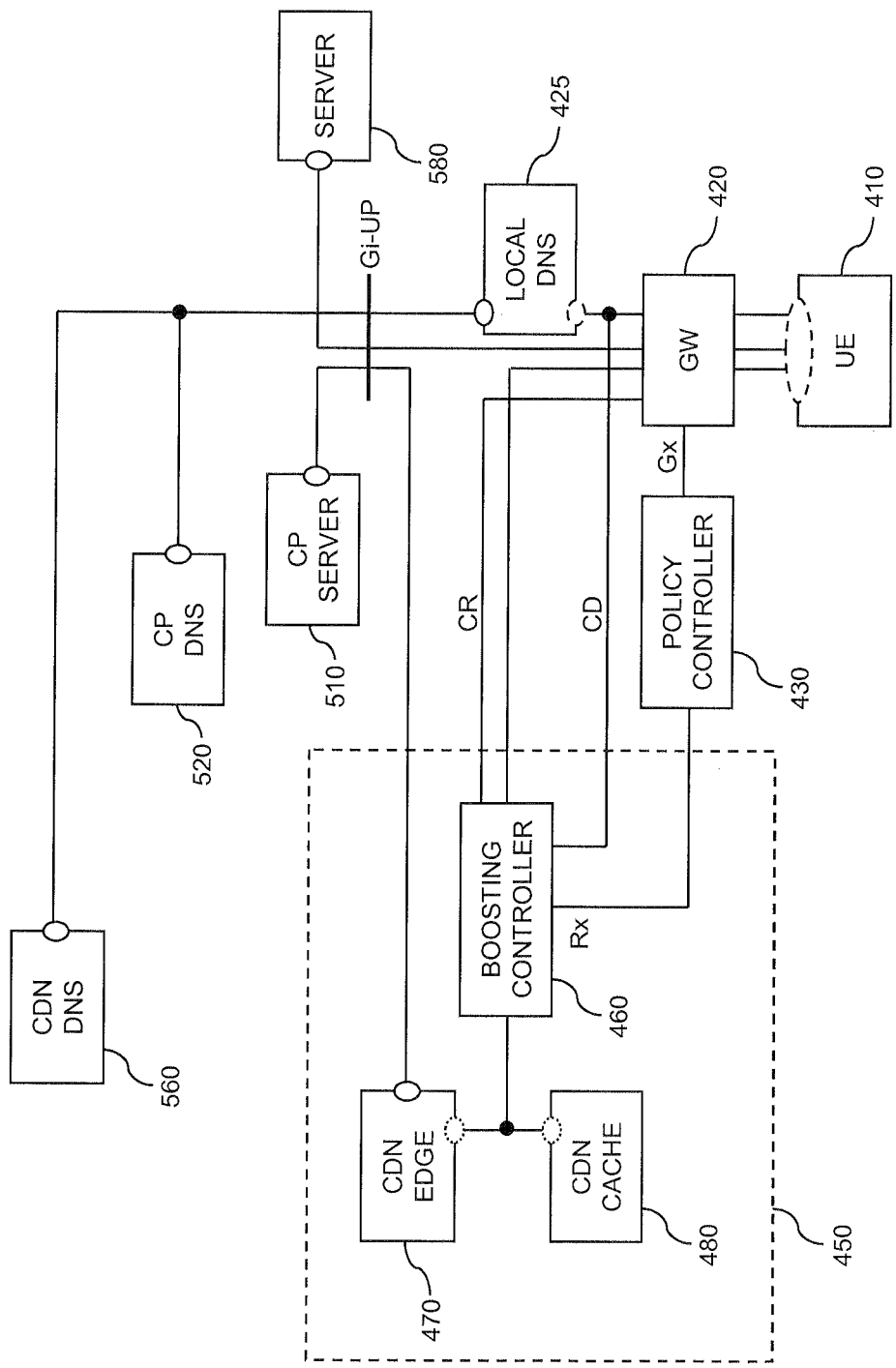
FIG. 4 shows a communication network environment in which concepts according to an embodiment of the invention are applied in a content booster architecture.

FIG. 4 shows a communication network environment with a content booster architecture, in which the above concepts of bearer control on the basis of probing may be applied. The purpose of the content booster architecture is to offer an improved QoE in content delivery from one or more content providers, which are an example of the network resources 80 as illustrated in FIG. 1. As illustrated, the content booster architecture includes infrastructure of a mobile broadband (MBB) operator, i.e., a GW 420 to which a UE 410 may attach, a policy controller 430, a local Domain Name System (DNS) 425, and an Internet Peering Point Gi-UP. Co-located with this infrastructure is a content booster infrastructure 450, which includes a boosting controller 460. Further, the content booster infrastructure 450 includes an edge server 470 of a CDN and/or a cache server 480 of a CDN. The purpose of the edge server 470 and the cache server 480 is to accelerate delivery of content from a content provider (CP) server 510 to the GW 420 by acting as a local proxy and a local cache, respectively. Further, the co-location with the infrastructure of the MBB operator also allows for accelerating content delivery from the GW 420 to the UE 10.

In addition, FIG. 4 also illustrates a CP DNS 520, an external CDN DNS 560, and an external server 580, e.g., any type of Internet server. It is to be understood that the content booster infrastructure 450 may actually have interfaces towards a plurality of MBB networks, CPs, and CDNs.

In general terms, the idea of the content booster architecture is to perform differentiated handling of data traffic on a communication path using the content booster infrastructure acting as a broker. The broker may have service agreements on the one hand with one or more CPs, e.g., with an Internet auction provider, and on the other hand with one or more MBB operators who in turn have associated subscribers with respective UEs. The CPs may also have agreements with CDN providers to host content so that it can transmitted in a differentiated way, e.g., with higher quality of service, to users. The broker may control upgrades or downgrades for priority of traffic between the GW 420 and the UE 410. For this purpose, the boosting controller 460 can inspect end user content request messages, inspect end user DNS replies, keep track of charging and service agreement fulfillment, trigger a priority upgrade request, or trigger a priority downgrade request. For these purposes the boosting controller 460 and in general the content booster architecture 450 may comprise interfaces as depicted in FIG. 4. More specifically, the boosting controller 460 may have an interface with respect to the policy controller 430 in order to downgrade or upgrade priority of traffic, e.g., by initiating bearer control procedures. As illustrated, this interface may be implemented as the R interface according to the 3GPP TSs. Further, the boosting controller 460 may have an interface for receiving copied DNS traffic CD between the GW 420 and the local DNS 425. This allows the boosting controller 460 to identify whether a DNS request is for content from a peered CP requiring prioritized delivery of content by the content boosting infrastructure 450. Further, the boosting controller 460 may have an interface with respect to the GW 420 for receiving copied authentication signaling CR with respect to the GW 420, e.g., signaling according to the Radius protocol or the Diameter protocol. Moreover, the boosting controller 460 may be provided with an interface to the edge server 470 and/or to the cache server 480, as well as an interface with respect to the GW 420. The latter interfaces have the purpose of routing traffic between the edge server 470 and/or cache server 480 and the GW 420 through the boosting controller. This traffic comprises the selected data traffic to be prioritized.

The edge server 470 in turn may be provided with an external packet interface with respect to the CP server 510, which allows the edge server 470 to obtain content data for delivery to UEs connected to the GW 420, and an internal packet interface with respect to the boosting controller 460 and the cache server 480. Similarly, the cache server 480 may be provided with an internal packet interface with respect to the boosting controller 460 and the edge server 470. The internal packet interface of the cache server 480 allows the cache server 480 to cache content data obtained by the edge server 470 and to provide cached content data via the boosting controller 460 and the GW 420 to UEs. In some implementations, e.g., in implementations without the edge server 470, the cache server 480 could also be provided with an external packet interface with respect to the CP server 510, which would allow the cache server 480 to directly obtain content data for delivery to UEs connected to the GW 420.

Here, it is to be noted that the internal packet interfaces of the above components of the content boosting infrastructure 450 are preferably implemented with network addresses from a specific range, e.g., IP addresses from a private subnet. Accordingly, it is possible to efficiently differentiate between traffic from the content booster infrastructure 450 and other traffic, e.g., from the server 580, using the network addresses in the data packets of the traffic. More specifically, the GW 420 and/or the UE 410 may use packet filters matching the network addresses from the specific range.

In some implementations, the components of the content boosting infrastructure 450 may be configured with two different specific ranges of network addresses, e.g., IP addresses from two different private subnets. One specific range may then be associated with peered CPs requiring prioritized delivery of content while the other specific range may be associated with peered CPs not requiring prioritized delivery of content or a different level of prioritization.

The CDN DNS 560 may be configured to resolve a DNS request towards peered CPs accordingly. For example, it may return a corresponding address from the specific range or ranges of network addresses used by the content boosting infrastructure. The CDN DNS 560 may identify the MBB operator by the network address of the local DNS 425.

In the content boosting architecture as illustrated in FIG. 4, the above concepts of bearer control on the basis of probing may be applied in the boosting controller 460. That is to say, the boosting controller 460 may act as the network node 100 of FIGS. 2 and 3, the UE 410 corresponding to the UE 10 of FIGS. 2 and 3, and the GW 420 corresponding to the GW 26 of FIGS. 2 and 3. In this case, the boosting controller 460 has the possibility of invoking usage of a certain dedicated bearer between the GW 420 and the UE 410 only if a prioritization is actually needed. This is beneficial for the MBB operator because it allows for a more efficient usage of radio resources. For example, in HSPA and LTE, applying traffic prioritization may lead to suboptimal radio scheduling and hence reduced system capacity. Further, this may also be beneficial for the subscriber using the UE 410, which can reduce battery consumption by a more efficient configuration of the radio interface.

Figure 5:
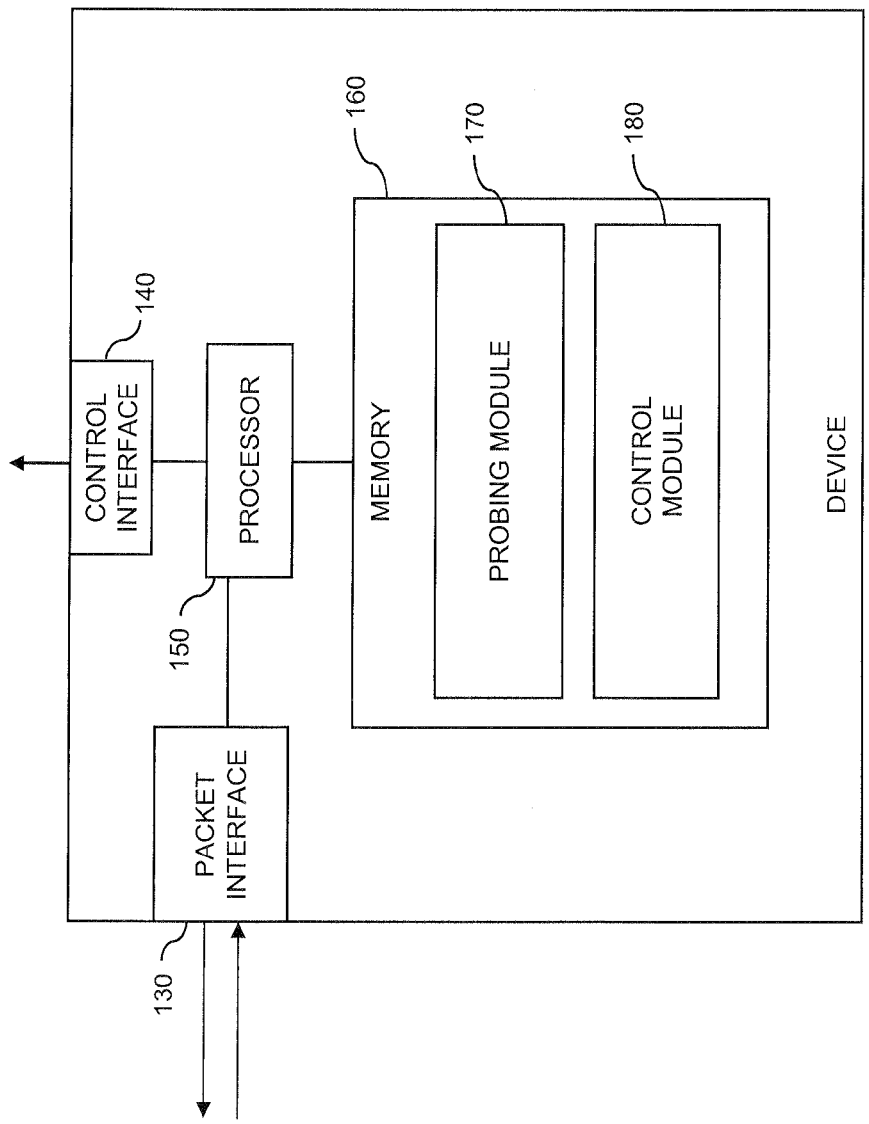
FIG. 5 schematically illustrates a device according to an embodiment of the invention.

FIG. 5 further illustrates a device for implementing the above concepts of bearer control on the basis of probing. The device may correspond to the network node 100 of FIGS. 2 and 3. However, the device may also correspond to some other network node or to the UE 10.

In the illustrated example, the device includes a packet interface 130 to send packets and to receive packets. The packet interface 130 may in particular be used for sending the above-mentioned probe packets and receiving the corresponding response packets, e.g., in the form of IP packets such as ICMP packets or data packets of regular data traffic. Further, the device may also be provided with a control interface 140. The control interface 140 may be used for sending control signaling to initiate bearer control procedures as explained above. In the illustrated 3GPP scenario, the control interface 140 may be implemented as the Rx interface according to the 3GPP TSs. If the device is implemented as a UE, the packet interface 130 may be a radio interface and the control interface may be implemented using the same radio interface, e.g., by a control channel established via the radio interface.

Further, the device includes a processor 150 coupled to the interfaces 130, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities bearer control on the basis of probing. More specifically, the memory 160 may include a probing module 170 so as to implement the above-described sending of probe packets, receiving of response packets, and measuring a parameter representing the delay traffic experiences on a certain bearer, and a control module 180 so as to implement the above-described initiation of bearer control procedures on the basis of the measured parameter. The processor 150 in connection with the probing module 170 may implement functionalities of the delay monitor 110 as illustrated in FIG. 2, whereas the processor 150 in connection with the control module may implement the various control functionalities as described above, i.e., may implement a controller responsible for initiating the bearer control procedures or other control functionalities.

It is to be understood that the structure as illustrated in FIG. 5 is merely schematic and that the device may actually include further components which, for the sake of clarity, have not been illustrated, e.g., further interfaces. Also, it is to be understood that the memory 150 may include further types of program code modules, which have not been illustrated, e.g., program code modules for suitably generating probe packets. According to some embodiments, also a computer program product may be provided for implementing concepts according to embodiments of the invention, e.g. a medium storing the program code to be stored in the memory 160.

FIG. 6 shows a flowchart illustrating a method according to an embodiment of the invention. The method may be used in a mobile communication system as illustrated in FIG. 1 and in particular be implemented by the network node 100. However, it is to be understood that the method may also be implemented in other devices, such as the UE 10.

At step 610, one or more probe packets are sent via one or more bearers established with respect to a UE. At least one of the bearers may be used for carrying selected data traffic. For example, as explained above, probe packets may be sent on one bearer, e.g., the default bearer 52 of FIGS. 2 and 3, and further probe packets may be sent on a further bearer, e.g., the dedicated bearer 54 of FIGS. 2 and 3. The probe packets may be any type of packets causing the recipient of the packets to return a response packet, e.g., ICMP echo request packets or data packets of the selected data traffic or other data traffic which are transmitted using a transport protocol requiring the sending of acknowledgement packets, e.g., TCP.

In order to be able to probe certain bearers, the probe packets may comprise an identifier causing the probe packet to be directed to the desired bearer, e.g., a suitably selected source network address or packet marking, e.g., a DSCP. The probe packets may be generated accordingly, e.g., by a correspondingly configured packet generator.

At step 620, at least one response packet, which is returned in response to the probe packet, is received. The type of the response packet depends on the used type of probe packet. For example, if the probe packet is an ICMP echo request packet, the response packet may be an ICMP echo reply packet.

At step 630, a parameter corresponding to a time period between the sending of the probe packet and the receiving of the response packet is measured. For example, the parameter may be measured as a RTT. The parameter may be indicative of a delay the selected data traffic is experiencing on the probed bearer.

At step 640, a bearer control procedure is initiated on the basis of the measured parameter. For this purpose, the parameter may be used to determine whether the probed bearer is suitable to carry the selected data traffic. For example, the measured parameter may be compared to a threshold value. If the selected data traffic is being carried by some other bearer than the probed bearer and the comparison to the threshold value indicates that the probed bearer is suitable to carry the selected data traffic, the bearer control procedure may be initiated to direct the data packets to the probed bearer. If the selected data traffic is being carried by the probed bearer and the comparison indicates that the probed bearer is not suitable to carry the selected data traffic, a bearer control procedure may be initiated to direct the data packets from the probed bearer to another bearer.

The bearer control procedure may comprise directing data packets of the selected data traffic to the probed bearer, e.g, by configuring a packet filter or modifying a marking of the data packets. The bearer control procedure may also comprise directing data packets of the selected data traffic to a further bearer, e.g, by configuring a packet filter or modifying a marking of the data packets. The further bearer may have different quality of service parameters than the probed bearer. The bearer control procedure may also comprise establishing the further bearer or releasing the further bearer. The bearer control procedure may also comprises modifying at least one quality of service parameter of the probed bearer, thereby downgrading or upgrading the bearer.

In some embodiments, multiple bearers may be probed and the measured parameters on the different bearers may be used as a basis for initiating the bearer control procedure. For example, in addition to sending the probe packets on one bearer established with respect to the UE, e.g., on the default bearer 52, also one or more further probe packets may be sent on a further bearer established with respect to the UE, e.g., on the dedicated bearer 54. In this case also further response packets returned in response to receiving the further probe packets may be received and a further parameter corresponding to a time period between said sending of the further probe packet and said receiving of the further response packet can be measured. The bearer control procedure may then be initiated on the basis of the parameter and the further parameter, e.g., on the basis of a comparison between the parameter and the further parameter or on the basis of a comparison of the difference between the parameter and the further parameter to a threshold value.

The sending of the probe packets or further probe packets may be accomplished while data packets are being transmitted on the bearer and be carried out so as to allow a repeated probing of the bearer, e.g., at regular time intervals. However, if there is no other data traffic on the bearer, also the probing of the bearer may be stopped so as to avoid unnecessary resource usage.

As can be seen, the above-described concepts of bearer control on the basis of probing allow for an efficient usage of resources by avoiding unnecessary usage of bearers, e.g., for prioritization of traffic or other types of differentiated handling.

It is to be understood that the examples and embodiments as explained above are merely illustrative and susceptible to various modifications. For example, the concepts could be used in other types of communication network environment using bearers. Also, the probing may be performed by various devices, including network nodes such as the boosting controller 460 of FIG. 4 or network nodes in the mobile communication network, such as a gateway, but also UEs. Further, it is to be understood that the above concepts may be implemented by using correspondingly designed software to be executed by a processor of an existing device, or by using dedicated device hardware.

The invention claimed is:

1. A method of controlling data traffic, comprising:
   sending at least one probe packet via a default bearer established with respect to a user equipment;
   receiving at least one response packet returned in response to the probe packet;
   measuring a parameter corresponding to a time period between said sending of the probe packet and said receiving of the response packet;
   on the basis of the measured parameter, initiating a bearer control procedure with respect to the user equipment,
   the bearer control procedure comprising directing data packets of selected data traffic either to the default bearer or to a dedicated bearer established with respect to the user equipment,
   sending at least one further probe packet via the dedicated bearer,
   receiving at least one further response packet returned in response to receiving the further probe packet;
   measuring a further parameter corresponding to a time period between said sending of the further probe packet and said receiving of the further response packet; and
   wherein said bearer control procedure is initiated on the basis of the parameter and the further parameter.

2. The method according to claim 1, wherein the bearer control procedure comprises establishing the dedicated bearer.

3. The method according to claim 2, wherein the bearer control procedure comprises releasing the dedicated bearer.

4. The method according to claim 1, wherein said directing of the data packets is accomplished by modifying one or more packet filters.

5. The method according to claim 1, wherein said directing of the data packets is accomplished by modifying an identifier in the data packets.

6. The method according to claim 1, wherein the bearer control procedure comprises modifying at least one quality of service parameter of the default bearer.

7. The method according to claim 1, wherein the bearer control procedure is initiated on the basis of a comparison of the parameter to a threshold value.

8. The method according to claim 1, wherein the probe packet comprises an identifier causing the probe packet to be directed to the default bearer.

9. The method according to claim 1, wherein the bearer control procedure is initiated on the basis of a comparison between the parameter and the further parameter.

10. The method according to claim 9, wherein the bearer control procedure is initiated on the basis of a comparison of the difference between the parameter and the further parameter to a threshold value.

11. The method according to claim 1, wherein the further probe packet comprises an identifier causing the further probe packet to be directed to the dedicated bearer.

12. The method according to claim 1, wherein said sending of probe packets is accomplished while data packets are being transmitted on the bearer.

13. The method according to claim 1, wherein the probe packet and the response packet are data packets for communication of data traffic with respect to the user equipment.

14. A device for controlling data traffic, comprising:
   a packet interface for sending at least one probe packet via a default bearer established with respect to a user equipment and receiving at least one response packet returned in response to the probe packet;
   a processor configured to measure a parameter corresponding to a time period between said sending of the probe packet and said receiving of the response packet and, on the basis of the measured parameter, to initiate a bearer control procedure with respect to the user equipment,
   the bearer control procedure comprising directing data packets of selected data traffic either to the default bearer or to a dedicated bearer established with respect to the user equipment,
   the processor is further configured to send at least one further probe packet via the dedicated bearer, receive at least one further response packet returned in response to receiving the further probe packet, and measure a further parameter corresponding to a time period between the sending of the further probe packet and the receiving of the further response packet; and
   wherein the bearer control procedure is initiated on the basis of the parameter and the further parameter.

15. The device according to claim 14, comprising:
   a control interface for sending a control signal to initiate said bearer control procedure.

16. The device according to claim 14, wherein the processor performs the bearer control procedure by establishing the dedicated bearer.

17. The device according to claim 14, wherein the processor performs the bearer control procedure by establishing the dedicated bearer.

18. The device according to claim 14, wherein the processor performs the bearer control procedure by modifying an identifier in the data packets.

19. The device according to claim 14, wherein the processor performs the bearer control procedure by modifying at least one quality of service parameter of the default bearer.

20. The device according to claim 14, wherein the bearer control procedure is initiated on the basis of a comparison between the parameter and the further parameter.

21. The device according to claim 14, wherein the bearer control procedure is initiated on the basis of a comparison of the difference between the parameter and the further parameter to a threshold value.

* * * * *